(12) United States Patent
Chang et al.

(10) Patent No.: US 8,570,451 B2
(45) Date of Patent: Oct. 29, 2013

(54) DISPLAY APPARATUS AND LIQUID CRYSTAL LENS

(75) Inventors: Che-Wei Chang, Taoyuan County (TW); Tzu-Hsuan Huang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 43 days.

(21) Appl. No.: 13/454,089

(22) Filed: Apr. 24, 2012

(65) Prior Publication Data

US 2013/0201415 A1 Aug. 8, 2013

(30) Foreign Application Priority Data

Feb. 4, 2012 (TW) .............................. 101103671 A

(51) Int. Cl.
*G02F 1/1335* (2006.01)
(52) U.S. Cl.
USPC ............................................ 349/15; 349/200
(58) Field of Classification Search
USPC .......................................................... 349/15
See application file for complete search history.

(56) References Cited

U.S. PATENT DOCUMENTS

| 2008/0266381 | A1 | 10/2008 | Smith et al. |
| 2010/0110316 | A1* | 5/2010 | Huang et al. ............... 349/15 |
| 2011/0102689 | A1 | 5/2011 | Chiu |
| 2011/0157496 | A1 | 6/2011 | Im |
| 2012/0300042 | A1* | 11/2012 | Yun et al. ................... 349/15 |

FOREIGN PATENT DOCUMENTS

| TW | M395187 | 12/2010 |
| TW | 201115221 | 5/2011 |

* cited by examiner

*Primary Examiner* — Richard Kim
(74) *Attorney, Agent, or Firm* — Jianq Chyun IP Office

(57) ABSTRACT

A display apparatus and a liquid crystal lens are provided. The display apparatus includes a display panel and a liquid crystal lens. The liquid crystal lens includes a first substrate, a second substrate, a liquid crystal layer, a first electrode layer, a second electrode layer, a third electrode layer, and an insulating layer. The liquid crystal layer is between the first and second substrates. The first electrode layer is between the first substrate and the liquid crystal layer. The second electrode layer is between the second substrate and the liquid crystal layer. The third electrode layer is between the second electrode layer and the second substrate. The liquid crystal layer is driven by the first, second, and third electrode layers and has a refractive index that is first decreased and then increased to define a lens unit. The insulating layer is between the second and third electrode layers.

20 Claims, 8 Drawing Sheets

DISPLAY APPARATUS AND LIQUID CRYSTAL LENS

CROSS-REFERENCE TO RELATED APPLICATION

This application claims the priority benefit of Taiwan application serial no. 101103671, filed on Feb. 4, 2012. The entirety of the above-mentioned patent application is hereby incorporated by reference herein and made a part of this specification.

BACKGROUND OF THE INVENTION

1. Field of the Invention

The invention relates to a display apparatus and an optical device, and more particularly to a display apparatus and a liquid crystal lens.

2. Description of Related Art

According to the main principle of stereo display techniques, the left eye and the right eye of a viewer respectively receive different images, and the images received by the left eye and the right eye of the viewer are analyzed and are overlapped by the brain, such that the viewer perceives gradation and depth information of the images and thereby generates stereo vision. Accordingly, in order to display stereo images on a flat display, two sets of images information alternatively need to be provided in the same image frame to simulate vision of two eyes. The two sets of images information are then respectively received by two eyes of the viewer through a particular optical device, so as to achieve stereo display effects.

At present, two auto-stereoscopic techniques are applied to accomplish the stereo display effects with naked eyes, i.e., either a parallax barrier or a column lens array may be utilized to project images to a viewer's left and right eyes, respectively. In addition, a liquid crystal lens stereo display has been proposed to replace the stereo display with the design of parallax barrier or column lens array, so as to form a switchable display capable of displaying two-dimensional (2D) images or three-dimensional (3D) images. In the liquid crystal lens stereo display, liquid crystal molecules in the liquid crystal layer are driven by the electric field applied thereto, such that the direction of the major axis of the liquid crystal molecules is changed along with variations in the electric field intensity. As such, the refractive index distribution of the liquid crystal lens in the stereo display may be similar to that of a physical lens. Nonetheless, the liquid crystal lens requires a complicated electrode design and a complex driving way for equalizing the function of the liquid crystal lens to the function of the physical lens. Hence, the electric field distribution and the design of the liquid crystal lens may be further improved.

SUMMARY OF THE INVENTION

The invention is directed to a display apparatus and a liquid crystal lens. Through the electrode design of the liquid crystal lens, the liquid crystal layer may be driven merely by one driving voltage to achieve the same optical effects as those of the optical lens. In addition, driving the liquid crystal lens allows the display apparatus to switch between a 2D image display mode and a 3D image display mode.

In the invention, a liquid crystal lens that includes a first substrate, a second substrate, a liquid crystal layer, a first electrode layer, a second electrode layer, a third electrode layer, and an insulating layer is provided. The liquid crystal layer is disposed between the first and second substrates. The first electrode layer is disposed between the first substrate and the liquid crystal layer. The second electrode layer is disposed between the second substrate and the liquid crystal layer, and the second electrode layer includes a plurality of floating second electrodes. The third electrode layer is disposed between the second electrode layer and the second substrate and includes a plurality of third electrodes. Each of the second electrodes covers a location of at least one of the third electrodes to form a plurality of driving units. The driving units are arranged along a direction. Here, the liquid crystal layer is driven by the first electrode layer, the second electrode layer, and the third electrode layer, such that a refractive index of the liquid crystal layer is first decreased and then increased along the direction to define a lens unit. The insulating layer is disposed between the second and third electrode layers.

According to an embodiment of the invention, the number of the third electrodes covered by each of the second electrodes is identical, so as to form the driving units.

According to an embodiment of the invention, parts of the third electrodes in the lens unit are enabled, and the other parts of the third electrodes in the lens unit are disabled.

According to an embodiment of the invention, the number of the third electrodes in at least two of the driving units is different.

According to an embodiment of the invention, a width of the second electrodes is identical.

According to an embodiment of the invention, a width of at least two of the second electrodes is different.

According to an embodiment of the invention, the second electrode layer further includes a plurality of auxiliary electrodes adjacent to the driving units, and a driving voltage is suitable for being input to the auxiliary electrodes.

According to an embodiment of the invention, a distance between the auxiliary electrodes is substantially equal to a width of the lens unit.

According to an embodiment of the invention, the third electrode layer further includes a plurality of auxiliary electrodes, and locations of the auxiliary electrodes are exposed by the floating second electrodes.

According to an embodiment of the invention, a voltage of the third electrodes is substantially equal to a voltage of the auxiliary electrodes.

According to an embodiment of the invention, a ground voltage is input to the first electrode layer, and a driving voltage is input to the third electrodes.

In the invention, a display apparatus that includes a display panel and a liquid crystal lens is provided. The display panel has a plurality of pixel units. The liquid crystal lens is disposed on the display panel. Here, the liquid crystal lens includes a first substrate, a second substrate, a liquid crystal layer, a first electrode layer, a second electrode layer, a third electrode layer, and an insulating layer. The liquid crystal layer is disposed between the first and second substrates. The first electrode layer is disposed between the first substrate and the liquid crystal layer. The second electrode layer is disposed between the second substrate and the liquid crystal layer, and the second electrode layer includes a plurality of floating second electrodes. The third electrode layer is disposed between the second electrode layer and the second substrate and includes a plurality of third electrodes. Each of the second electrodes covers a location of at least one of the third electrodes to form a plurality of driving units. The driving units are arranged along a direction. Here, the liquid crystal layer is driven by the first electrode layer, the second electrode layer, and the third electrode layer, such that a refractive index of the liquid crystal layer is first decreased and then increased along the direction to define a lens unit. The insulating layer is disposed between the second and third electrode layers.

According to an embodiment of the invention, the lens unit corresponds to at least two of the pixel units.

According to an embodiment of the invention, the liquid crystal lens provides a stereo display function when the liquid crystal lens is driven to form the lens unit.

Based on the above, in the structural design of the liquid crystal lens of the invention, a driving voltage is provided to the third electrodes, such that the electric field gradient between the second electrodes and the first electrodes at two sides of the liquid crystal layer is distributed in a specific manner. At this time, the liquid crystal molecules in the liquid crystal layer may be driven according to the electric field gradient and can thus provide different refractive indexes in the same viewing direction. As such, the electrode design and the driving manner of the liquid crystal lens may be simplified for providing the effect as an optical lens. Moreover, since the liquid crystal lens is driven or not, the display apparatus is allowed to switch between the 2D image display mode and the 3D image display mode.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
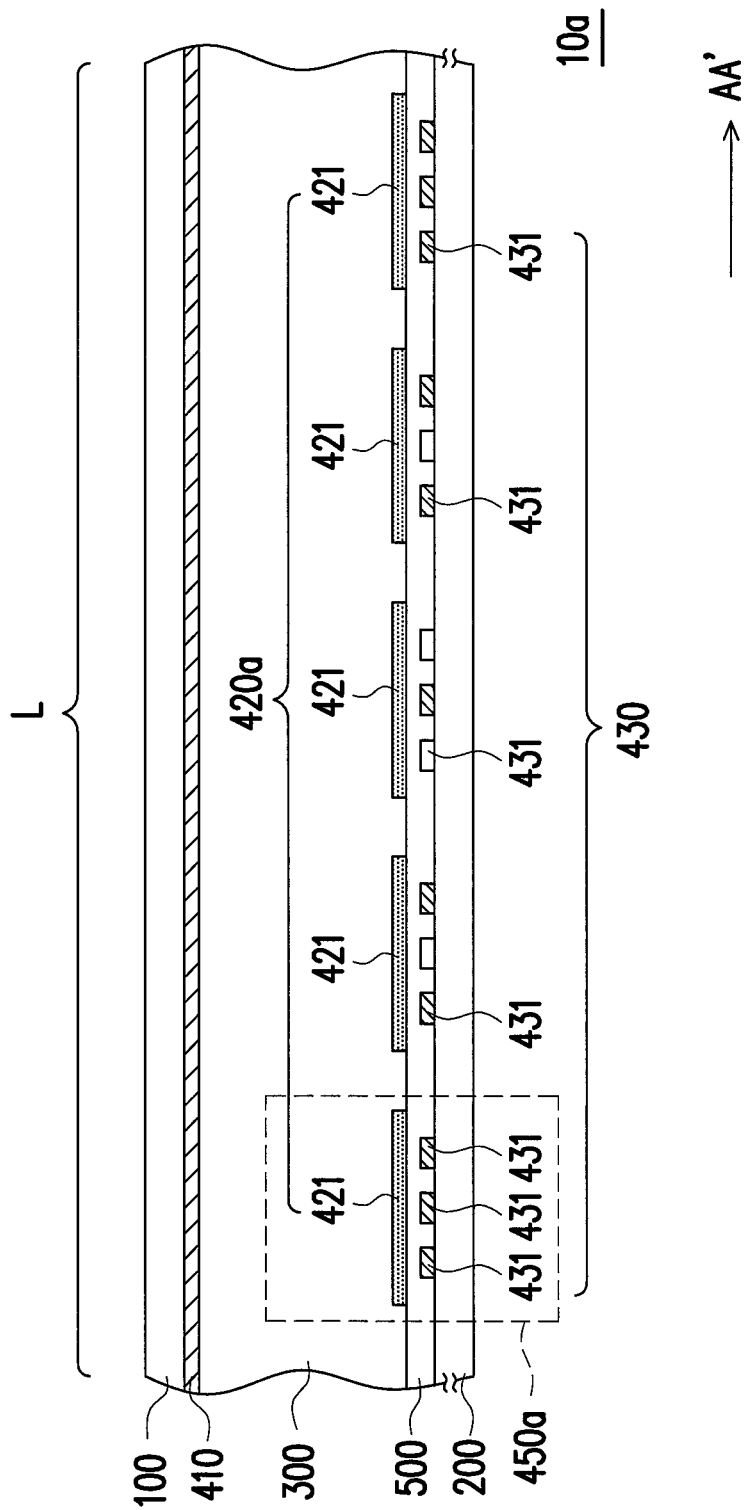
FIG. 1A is a cross-sectional view illustrating a liquid crystal lens according to an embodiment of the invention.

FIG. 1A is a cross-sectional view illustrating a liquid crystal lens according to an embodiment of the invention. With reference to FIG. 1A, a liquid crystal lens 10a of the present embodiment includes a first substrate 100, a second substrate 200, a liquid crystal layer 300, a first electrode layer 410, a second electrode layer 420a, a third electrode layer 430, and an insulating layer 500.

In particular, the liquid crystal layer 300 is disposed between the first substrate 100 and the second substrate 200. The first electrode layer 410 is disposed between the first substrate 100 and the liquid crystal layer 300. The second electrode layer 420a is disposed between the second substrate 200 and the liquid crystal layer 300, and the second electrode layer 420a includes a plurality of floating second electrodes 421. The third electrode layer 430 is disposed between the second electrode layer 420a and the second substrate 200 and includes a plurality of third electrodes 431. The insulating layer 500 is disposed between the second electrode layer 420a and the third electrode layer 430. In the present embodiment, the first and second substrates 100 and 200 are, for instance, glass substrates, while the first and second substrates 100 and 200 may be made of other materials in other embodiments. The first, second, and third electrode layers 410, 420a, and 430 may be made of indium tin oxide (ITO), indium zinc oxide (IZO), or other appropriate transparent conductive materials, for instance. A material of the insulating layer 500 may include but should not be limited to silicon nitride or silicon oxide; namely, the insulating layer 500 may also be made of other transparent insulating materials.

Specifically, each of the second electrodes 421 covers the location of at least one of the third electrodes 431, so as to form a plurality of driving units 450a arranged along a horizontal direction AA'. For instance, in the present embodiment, each of the second electrodes 421 covers three of the third electrodes 431 to form a driving unit 450a. That is to say, each of the driving units 450a has the same number of third electrodes 431 according to the present embodiment, i.e. three third electrodes 431. Besides, each of the second electrodes 421 may have the same width according to the present embodiment. In other words, each of the driving units 450a of the present embodiment substantially has the same structural design. Note that the number of the electrodes described above is exemplary. In other embodiments, each of the second electrodes 420 may cover one, two, three, or more than three of the third electrodes 431.

The electric field with the specific distribution configuration need be provided to the liquid crystal layer 300, such that the refractive index presented by the liquid crystal layer 300 can have the required distribution for achieving the same optical effects as those accomplished by a physical lens. Hence, given that each of the driving units 450a has the same structural design, a ground voltage may be input to the first electrode layer 410, a driving voltage may be input to some of the third electrodes 431, and no driving voltage is input to the other third electrodes 431 according to the present embodiment. Thereby, the floating second electrodes 421 may have corresponding coupling voltages because of the underlying third electrodes 431 to which the driving voltage is input. Besides, the coupling voltages of the second electrodes 421 and the ground voltage of the first electrode layer 410 may generate an electric field that drives the liquid crystal layer 300. Namely, the number of the third electrodes 431 driven in each of the driving units 450 may be inconsistent, such that the different coupling voltages of the second electrodes 421 may facilitate the required electric field distribution.

In one single driving unit 450a, if the driving voltage is input to a great number of third electrodes 431, the corresponding second electrodes 421 are significantly affected by the voltage coupling effect, and thereby an intense electric field may be generated between the second electrodes 421 and the first electrode layer 410. By contrast, in each of the driving units 450a, if the driving voltage is input to a small number of third electrodes 431, the corresponding second electrodes 421 are insignificantly affected by the voltage coupling effect, and thereby a weak electric field may be generated between the second electrodes 421 and the first electrode layer 410. Hence, by controlling the number of the third electrodes 431 to which the driving voltage is input, the required electric field distribution along the horizontal direction AA' may be generated between the first substrate 100 and the second substrate 200. In other words, it is likely to achieve the desirable lens effects merely by applying one driving voltage to the third electrodes 431 of the third electrode layer 430 instead of inputting various driving voltages to different electrodes. Therefore, the driving method of the liquid crystal lens 10*a* is uncomplicated and conducive to simplification of driving circuits.

Since the liquid crystal layer 300 is driven by the first, second, and third electrode layers 410, 420*a*, and 430, different regions on the liquid crystal layer 300 may provide different refractive indexes in the same viewing direction. For instance, the refractive index of the liquid crystal layer 300 is gradually decreased and then increased along the horizontal direction AA', or vice versa, so as to define a lens unit L. It should be mentioned that the liquid crystal lens 10*a* of the present embodiment merely has one lens unit L as shown in the drawings, whereas the liquid crystal lens 10*a* in other embodiments of the invention may be constituted by a plurality of lens units L.

To be more specific, in FIG. 1A, the driving voltage is input to the third electrodes 431 with the oblique-line patterns but is not input to the third electrodes 431 without the oblique-line patterns. If the expected electric field distribution of the liquid crystal lens 10*a* is gradually decreased and then increased along the horizontal direction AA', the liquid crystal lens 10*a* having five driving units 450*a* (shown in FIG. 1A) is driven in a manner described below. The driving voltage is input to all of the third electrodes 431 in the outermost two driving units 450*a*. In the center driving unit 450*a*, the driving voltage is input to one of the third electrodes 431. In each of the two remaining driving units 450*a*, the driving voltage is input to two of the third electrodes 431. As such, the refractive index distribution of the liquid crystal layer 300 helps define a single lens unit L.

Figure 1B:
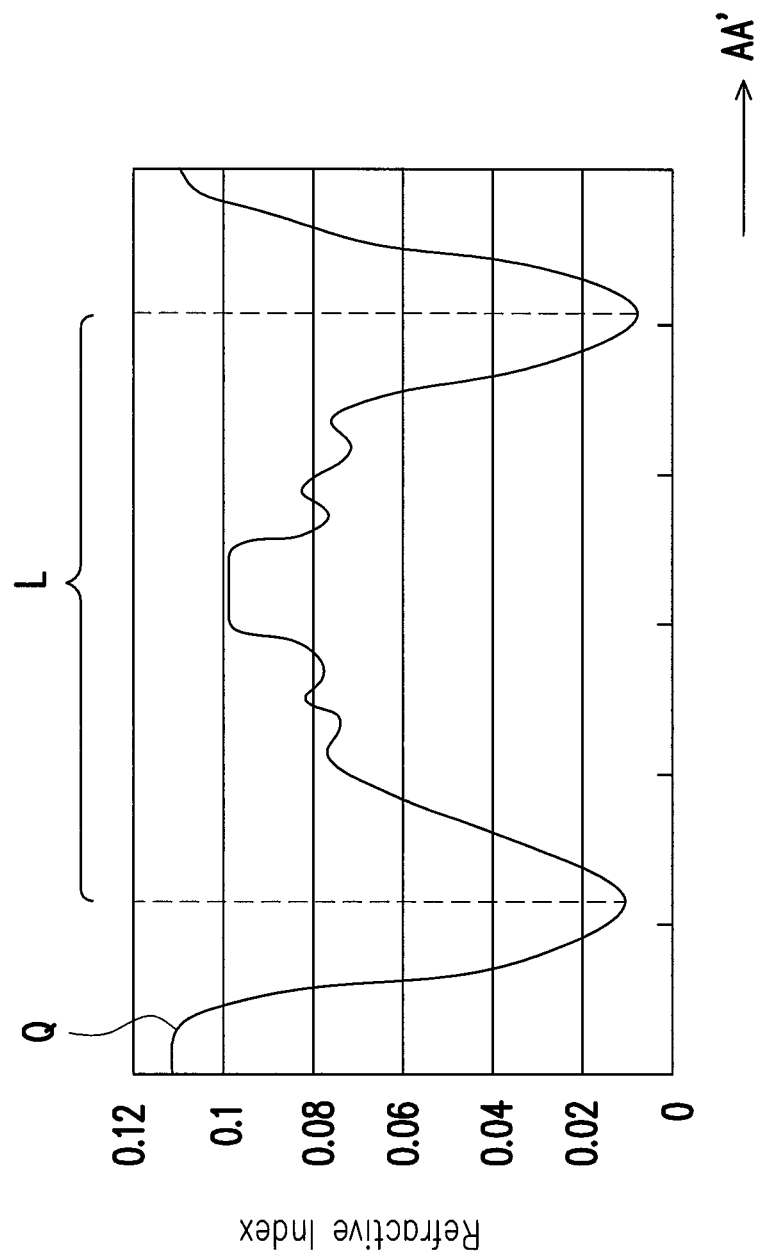
FIG. 1B illustrates the correlation between a location and a refractive index of a lens unit L in the liquid crystal lens depicted in FIG. 1A along a horizontal direction AA'.

FIG. 1B schematically illustrates the refractive index distribution of the lens unit L in the liquid crystal lens depicted in FIG. 1A along the horizontal direction AA'. The curve Q represents the refractive index distribution of the liquid crystal lens 10*a*. With reference to FIG. 1B, in the five driving units 450*a* of the liquid crystal lens 10*a*, the number of the third electrodes 431 to which the driving voltage is input is changed along the horizontal direction AA', so as to provide the liquid crystal layer 300 with the electric field having the gradient distribution. Based on the distribution of the electric field gradient (EFG), the liquid crystal molecules in the liquid crystal layer 300 may have different arrangements in the horizontal direction AA', so as to provide different refractive indexes. As shown in FIG. 1B, the refractive index of the liquid crystal layer 300 is gradually increased and then decreased along the horizontal direction AA'. Note that said variation tendency is merely exemplary and should not be construed as a limitation to the invention. In general, the correlation between the intensity of the electric field and the refractive index of the liquid crystal layer 300 may be determined by the liquid crystal material of the liquid crystal layer 300. Hence, when the electric field distribution shows the tendency to decrease and then increase along the horizontal direction AA', the refractive index of the liquid crystal layer 300 may be gradually decreased and then increased along the horizontal direction AA', or vice versa, so as to define the corresponding lens unit L.

Additionally, in the lens unit L of the liquid crystal lens 10*a*, the driven driving units 450*a* are symmetrically arranged. Hence, the refractive index distribution shown in FIG. 1B indicates that the lens unit L has the substantially symmetrical refractive index distribution along the horizontal direction AA'. Thereby, according to the present embodiment, the EFG distribution allows the liquid crystal lens 10*a* to have the required refractive index distribution for achieving the same optical effects as those of a physical lens. Moreover, if the driving voltage applied to the liquid crystal lens 10*a* is properly adjusted, the refractive index in the liquid crystal lens 10*a* can be controlled, and the focal length of the liquid crystal lens 10*a* may be correspondingly changed. Therefore, the liquid crystal lens 10*a* can perform the focusing function.

Certainly, the number of the electrified third electrodes 431 in each of the driving units 450*a* need not be different, i.e., the number of the third electrodes 431 which underlie each of the second electrodes 421 and are supplied with the driving voltage need not be different. Besides, in other embodiments, the width of the second electrodes 421 may be alternatively different, and so may the number of third electrodes 431 in any two of the driving units 450*a*. For instance, in the liquid crystal lens 10*b* shown in FIG. 2, the width of each second electrode 421 is identical, while the number of the third electrodes 431 in each driving unit 450*b* is different. In this case, the effect of EFG distribution can still be achieved by the liquid crystal lens 10*b*.

Figure 2:
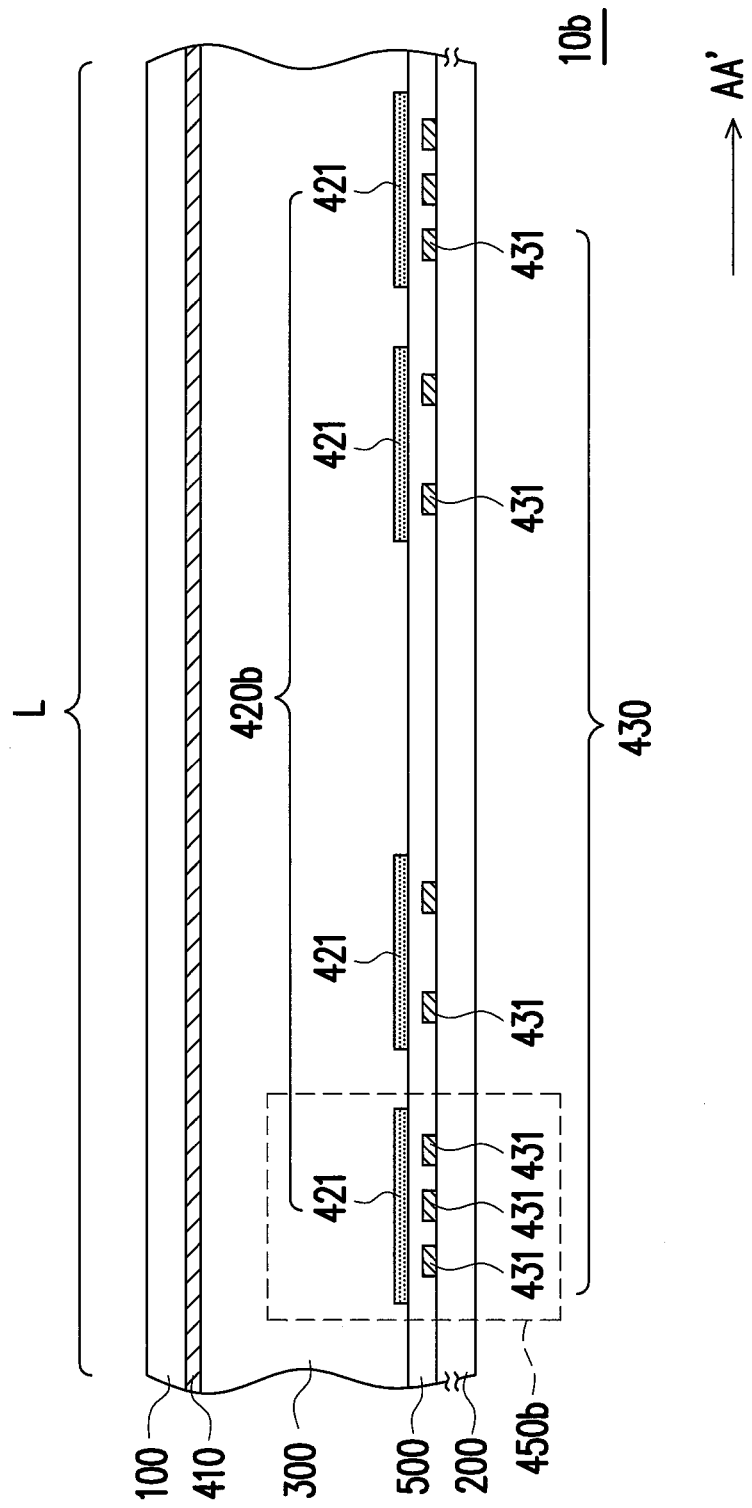
FIG. 2 is a cross-sectional view illustrating a liquid crystal lens according to an embodiment of the invention.

In FIG. 2, the driving voltage is input to the third electrodes 431 with the oblique line patterns, and the method for driving the liquid crystal lens 10*b* having one lens unit L with four driving units 450*b* is described below. The driving voltage is input to all of the third electrodes 431. Each of the outermost two driving units 450*b* has three third electrodes 431, and each of the middle two driving units 450*b* has two third electrodes 431. Based on the above, in the lens unit L of the liquid crystal lens 10*b*, the number of third electrodes 431 in the outermost two driving units 450*b* is more than the number of third electrodes 431 in the middle two driving units 450*b*, and thus the EFG distribution in the lens unit L of the liquid crystal lens 10*b* may be gradually decreased and then increased along the horizontal direction AA'. Moreover, the refractive index distribution of the liquid crystal layer 300 appears to have an uneven profile along the horizontal direction AA'.

The driving voltage is input to all of the third electrodes 431 shown in FIG. 2. However, in other embodiments of the invention, the driving voltage may be input to some of the third electrodes 431 in each driving unit 450*b*. For instance, the driving voltage may be selectively input to two of the third electrodes 431 in the outermost driving unit 450*b*.

Figure 3:
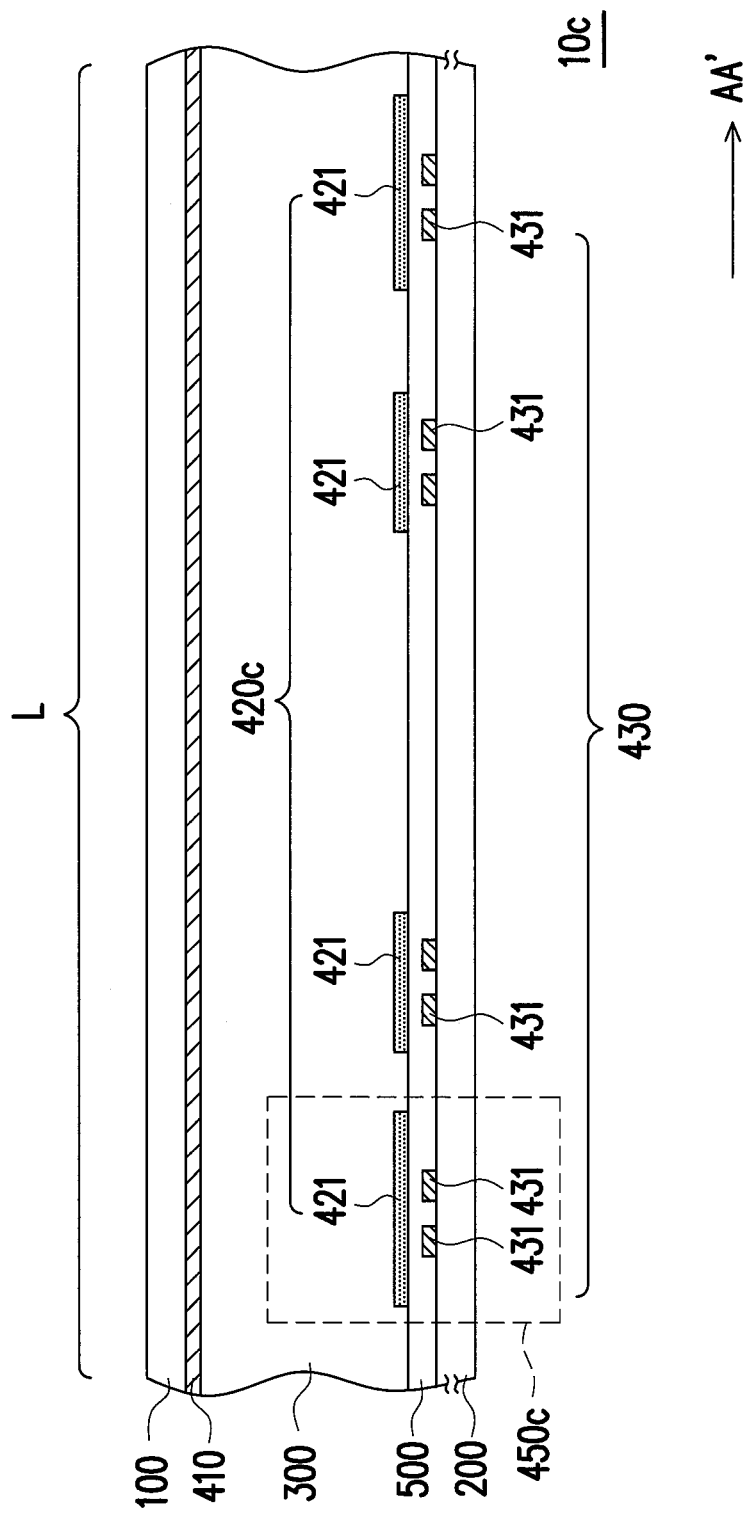
FIG. 3 is a cross-sectional view illustrating a liquid crystal lens according to an embodiment of the invention.

According to another embodiment of the invention, the width of the second electrodes 421 in each driving unit 450*c* may not be the same, as shown by the lens unit L of the liquid crystal lens 10*c* in FIG. 3. Besides, each of the driving units 450*c* is equipped with the same number of third electrodes 431.

In FIG. 3, the driving voltage is input to the third electrodes 431 with the oblique-line patterns. As to the liquid crystal lens 10*c*, the four driving units 450*c* in a single lens unit L may be selectively driven in the manner described below, so as to generate the optical effects similar to those of a physical lens. The driving voltage is input to all of the third electrodes 431. The width of the second electrodes 421 in the outermost two driving units 450*c* is relatively large, and the width of the second electrodes 421 in the middle two driving units 450*c* is relatively small. Based on the above, in the lens unit L of the liquid crystal lens 10*c*, the coupling effects on the second electrodes 421 in the outermost two driving units 450*c* are different from the coupling effects on the second electrodes 421 in the middle two driving units 450*c*, and thus the EFG distribution in the lens unit L of the liquid crystal lens 10*c* may be gradually increased and then decreased along the horizontal direction AA'. Moreover, the refractive index distribution of the liquid crystal layer 300 appears to have an uneven profile along the horizontal direction AA'.

According to the previous embodiments, it is likely to achieve the desirable lens effects merely by applying one driving voltage to the third electrodes 431 of the third electrode layer 430 instead of inputting various driving voltages to different electrodes. Therefore, the driving method of the liquid crystal lenses 10a-10c is uncomplicated and conducive to simplification of driving circuits.

Figure 4:
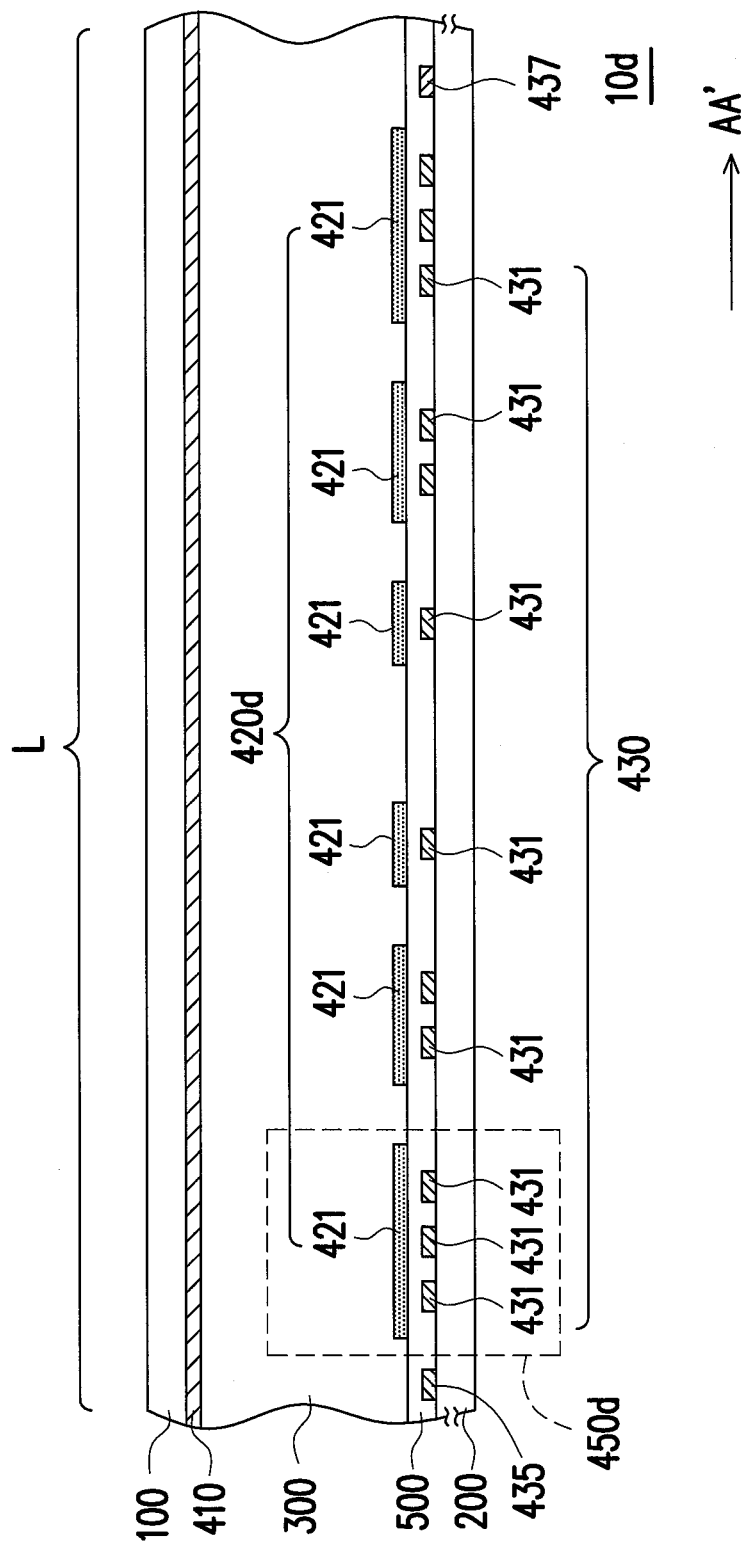
FIG. 4 is a cross-sectional view illustrating a liquid crystal lens according to an embodiment of the invention.

FIG. 4 is a cross-sectional view illustrating a liquid crystal lens according to another embodiment of the invention. With reference to FIG. 4, the liquid crystal lens 10d described in the present embodiment is similar to the liquid crystal lenses 10a-10c depicted in FIG. 1A, FIG. 2, and FIG. 3, while the difference lies in that the third electrode layer 430 of the present embodiment further includes a plurality of auxiliary electrodes 435 and 437, and locations of the auxiliary electrodes 435 and 437 are exposed by the floating second electrodes 421. According to the design described herein, the distance between the auxiliary electrodes 435 and 437 is substantially equal to the width of the lens unit L. In addition, when the liquid crystal lens 10d is driven, the driving voltage input to the auxiliary electrodes 435 and 437 may be substantially equal to the driving voltage input to the third electrodes 431.

In FIG. 4, the driving voltage is input to the third electrodes 431 and the auxiliary electrodes 435 and 437 with the oblique-line patterns. In the lens unit L of the liquid crystal lens 10d, the width of the second electrodes 421 in each of the four driving units 450d may not be the same, and the number of third electrodes 431 in each of the driving units 450d may not be the same as well. In addition, six driving units 450d are located between the auxiliary electrodes 435 and 437, and one side of the auxiliary electrodes 435 and 437 away from the first substrate 100 is not covered by the second electrodes 421. The driving voltage is input to the auxiliary electrodes 435 and 437 located at two ends of the lens unit L, and the auxiliary electrodes 435 and 437 are exposed by the floating second electrodes 421. Hence, the liquid crystal molecules in the liquid crystal layer 300 may be driven by a relatively extreme electric field at two ends of the lens unit L, and thus the refractive index distribution of the liquid crystal layer 300 may be varied to a great extent.

Figure 5:
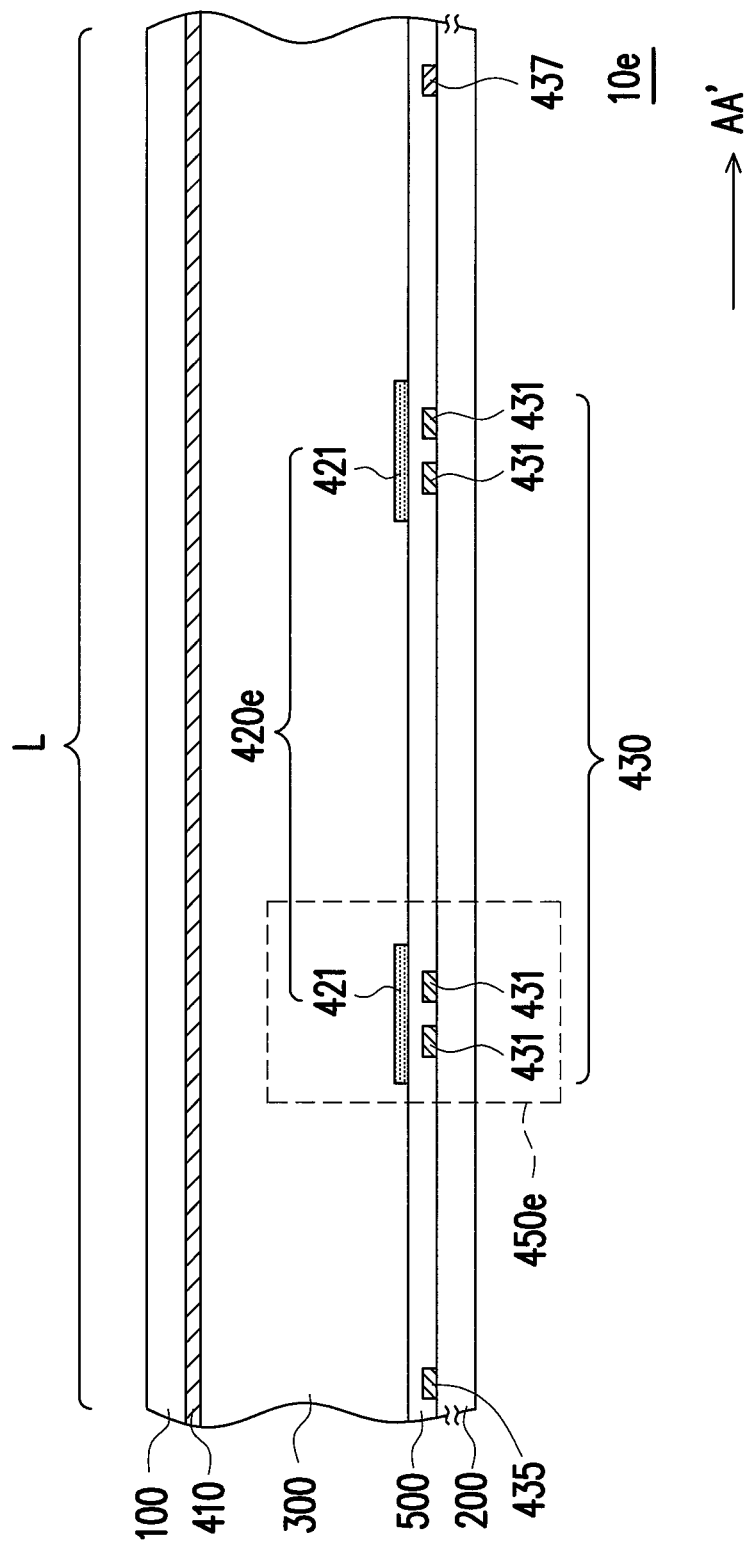
FIG. 5 is a cross-sectional view illustrating a liquid crystal lens according to an embodiment of the invention.

Besides, in the liquid crystal lens 10d described in this embodiment, the width of each second electrode 421 in each driving unit 450d may not be identical, and the number of third electrodes 431 in each driving unit 450d may not be identical as well. This should not be construed as a limitation to the invention. As indicated in FIG. 5, the liquid crystal lens 10e of the present embodiment is similar to the liquid crystal lens 10d depicted in FIG. 4, while the difference therebetween lies in that the width of each second electrode 421 in each driving unit 450e is identical, and so is the number of the third electrodes 431 in each driving unit 450e. Other technical features of the liquid crystal lens 10e are similar to those of the liquid crystal lens 10d and thus will not be further described hereinafter.

According to the present embodiment, when the same driving voltage is input to the auxiliary electrodes 435 and 437 and all of the third electrodes 431 of the driving units 421, the electric field having the gradient variation can be generated in the lens unit L. Therefore, if all of the driving units 450e have the same structural design and are driven in the same manner, the lens unit L is capable of accomplishing the same optical effects as those of the physical lens. In other words, as long as the auxiliary electrodes 435 and 437 are configured, the driving units 450e of the lens unit L need not have different structural design nor be driven in different ways according to the invention.

Figure 6:
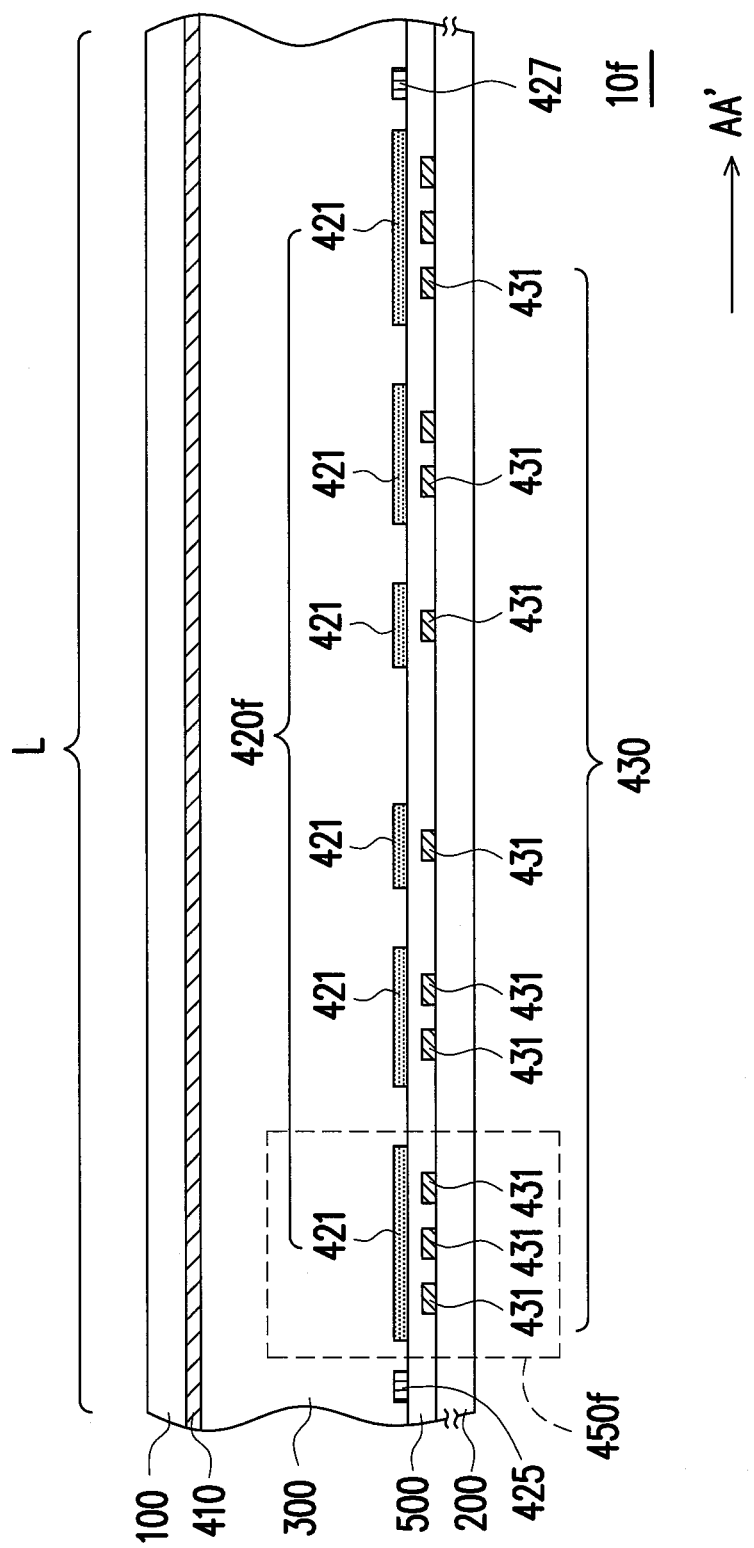
FIG. 6 is a cross-sectional view illustrating a liquid crystal lens according to an embodiment of the invention.

FIG. 6 is a cross-sectional view illustrating a liquid crystal lens according to another embodiment of the invention. With reference to FIG. 6, the liquid crystal lens 10f of the present embodiment is similar to the liquid crystal lenses 10a-10c depicted in FIG. 1A, FIG. 2, and FIG. 3, while the difference lies in that the second electrode layer 420f of the present embodiment further includes a plurality of auxiliary electrodes 425 and 427 adjacent to the driving units 450f. The distance between the auxiliary electrodes 425 and 427 is substantially equal to the width of the lens unit L. Besides, a driving voltage is suitable for being input to the auxiliary electrodes 425 and 427. That is to say, the main difference between the present embodiment and the embodiment shown in FIG. 4 consists in that the auxiliary electrodes 425 and 427 of the present embodiment are configured in the second electrode layer 420f.

At this time, the auxiliary electrodes 425 and 427 and the second electrodes 421 are in the same film layer, and the driving units 450f are all configured between the auxiliary electrodes 425 and 427. When the liquid crystal lens 10f is driven, the driving voltage may be input to the auxiliary electrodes 425 and 427, so as to generate a relatively extreme electric field in the lens unit L. Therefore, the refractive index distribution of the liquid crystal layer 300 may be varied to a great extent. According to the present embodiment, the driving voltage input to the auxiliary electrodes 425 and 427 may be the same as or different from the driving voltage input to the third electrodes 431, such that the refractive index distribution of the liquid crystal layer 300 complies with the actual design requirements. Namely, it is likely to achieve the desirable lens effects merely by applying one or two driving voltages to the third electrodes 431 and the auxiliary electrodes 425 and 427 instead of inputting three or more driving voltages to different electrodes. Therefore, the driving method of the liquid crystal lens 10f is uncomplicated and conducive to simplification of driving circuits.

Figure 7:
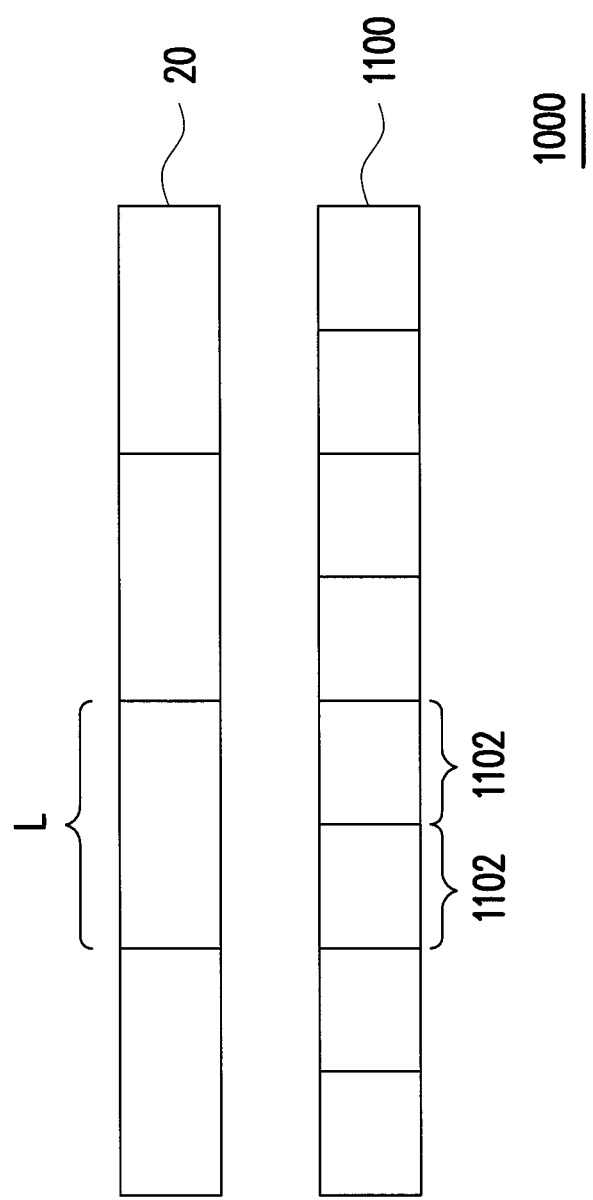
FIG. 7 is cross-sectional view illustrating a display apparatus according to an embodiment of the invention.

FIG. 7 is cross-sectional view illustrating a display apparatus according to an embodiment of the invention. With reference to FIG. 7, the display apparatus 1000 of the present embodiment includes a display panel 1100 and a liquid crystal lens 20. The display panel 1100 includes a plurality of pixel units 1102, and the liquid crystal lens 20 is disposed on the display panel 1100. The display panel 1100 described herein may be a liquid crystal display panel, an organic electroluminescent display panel, a plasma display panel, an electrophoretic display panel, a field emission display panel, and so on. Nevertheless, the above display panels are taken as examples, and the type of the display panel 1100 is not restricted in the invention. In other embodiments, the display panel 1100 may be another type of display panel. On the other hand, the liquid crystal lens 20 may be one of the liquid crystal lenses 10a-10f described in the previous embodiments, and therefore the technical features of the liquid crystal lens 20 already provided hereinbefore will not be further described.

In the display apparatus 1000, each lens unit L of the liquid crystal lens 20 corresponds to at least two of the pixel units 1102. When the liquid crystal lens 20 is driven (in the same way as driving the aforesaid liquid crystal lenses 10a-10f) to define the lens unit L, the stereo display function can be performed. Particularly, when the two pixel units 1102 corresponding to the lens unit L respectively display the left-eye image and the right-eye image, the two images, due to the optical effects of the lens unit L, are respectively projected to view zones visible to the left eye and the right eye. By contrast, when the liquid crystal lens 20 is not driven, the image displayed on the display panel 110 directly passes through the liquid crystal lens 20. As such, through driving the liquid crystal lens 20, the display apparatus 1000 is allowed to switch between the 2D image display mode and the 3D image display mode.

When each lens unit L corresponds to two or more pixel units 1102, the image displayed on the display panel 110 may be, due to the optical effects of the lens unit L, projected to two or more view zones, so as to achieve multi-view display effects. Hence, the number of the pixel units 1102 corresponding to each lens unit L is not limited in the invention.

In light of the foregoing, the liquid crystal lens alone or the liquid crystal lens in the display apparatus has the first electrode layer, the second electrode layer, and the third electrode layer. The second electrodes in the second electrode layer are in the floating state and cover the third electrodes in the third electrode layer, so as to form a plurality of driving units. At this time, through inputting the driving voltage to the third electrodes of the third electrode layer, an electric field may be generated between the floating second electrodes of the second electrode layer and the first electrode layer. Note that the third electrodes to which the driving voltage is input may be covered by the second electrodes; the more the electrified third electrodes covered by the second electrodes, the greater the coupling electric field on the liquid crystal layer. Hence, if the driving units each have different numbers of third electrodes to which the driving voltage is input, or the width of the second electrodes in the driving units is different, the liquid crystal layer may be affected by the electric field with gradient distribution, such that the refractive index of the liquid crystal layer may have gradient variation. In other words, the refractive index in the liquid crystal lens may be adjusted by controlling the way to drive the electrodes in the liquid crystal lens. Accordingly, the display apparatus and the liquid crystal lens described in the invention are capable of providing one driving voltage to the third electrode layer, such that the liquid crystal molecules in the liquid crystal layer may have different refractive indexes according to the driving electric field. As such, the electrode design and the driving manner of the liquid crystal lens may be simplified. Moreover, since the liquid crystal lens is driven, the display apparatus is allowed to switch between the 2D image display mode and the 3D image display mode.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A liquid crystal lens comprising:
   a first substrate;
   a second substrate;
   a liquid crystal layer disposed between the first substrate and the second substrate;
   a first electrode layer disposed between the first substrate and the liquid crystal layer;
   a second electrode layer disposed between the second substrate and the liquid crystal layer, the second electrode layer comprising a plurality of floating second electrodes;
   a third electrode layer disposed between the second electrode layer and the second substrate, the third electrode layer comprising a plurality of third electrodes, each of the second electrodes covering a location of at least one of the third electrodes to form a plurality of driving units, the driving units being arranged along a direction, wherein the liquid crystal layer is driven by the first electrode layer, the second electrode layer, and the third electrode layer, such that a refractive index of the liquid crystal layer is first decreased and then increased along the direction to define a lens unit; and
   an insulating layer disposed between the second electrode layer and the third electrode layer.

2. The liquid crystal lens as recited in claim 1, wherein the number of the third electrodes covered by each of the second electrodes is identical, so as to form the driving units.

3. The liquid crystal lens as recited in claim 1, wherein parts of the third electrodes in the lens unit are enabled, and the other parts of the third electrodes in the lens unit are disabled.

4. The liquid crystal lens as recited in claim 1, wherein the number of the third electrodes in at least two of the driving units is different.

5. The liquid crystal lens as recited in claim 1, wherein a width of the second electrodes is identical or the widths of at least two of the second electrodes are different.

6. The liquid crystal lens as recited in claim 1, wherein the second electrode layer further comprises a plurality of auxiliary electrodes adjacent to the driving units, and a driving voltage is suitable for being input to the auxiliary electrodes.

7. The liquid crystal lens as recited in claim 1, wherein the third electrode layer further comprises a plurality of auxiliary electrodes, and locations of the auxiliary electrodes are exposed by the floating second electrodes.

8. The liquid crystal lens as recited in claim 7, wherein a voltage of the third electrodes is substantially equal to a voltage of the auxiliary electrodes.

9. The liquid crystal lens as recited in claim 1, wherein a ground voltage is input to the first electrode layer, and a driving voltage is input to the third electrodes.

10. A display apparatus comprising:
    a display panel having a plurality of pixel units; and
    a liquid crystal lens disposed on the display panel and comprising:
    a first substrate;
    a second substrate;
    a liquid crystal layer disposed between the first substrate and the second substrate;
    a first electrode layer disposed between the first substrate and the liquid crystal layer;
    a second electrode layer disposed between the second substrate and the liquid crystal layer, the second electrode layer comprising a plurality of floating second electrodes;
    a third electrode layer disposed between the second electrode layer and the second substrate, the third electrode layer comprising a plurality of third electrodes, each of the second electrodes covering a location of at least one of the third electrodes to form a plurality of driving units, the driving units being arranged along a direction, wherein the liquid crystal layer is driven by the first electrode layer, the second electrode layer, and the third electrode layer, such that a refractive index of the liquid crystal layer is first decreased and then increased along the direction to define a lens unit; and
    an insulating layer disposed between the second electrode layer and the third electrode layer.

11. The display apparatus as recited in claim 10, wherein the lens unit corresponds to at least two of the pixel units.

12. The display apparatus as recited in claim 10, wherein the number of the third electrodes covered by each of the second electrodes is identical, so as to form the driving units.

13. The display apparatus as recited in claim 10, wherein parts of the third electrodes in the lens unit are enabled, and the other parts of the third electrodes in the lens unit are disabled.

14. The display apparatus as recited in claim 10, wherein the number of the third electrodes in at least two of the driving units is different.

15. The display apparatus as recited in claim 10, wherein a width of the second electrodes is identical or the widths of at least two of the second electrodes are different.

16. The display apparatus as recited in claim 10, wherein the second electrode layer further comprises a plurality of auxiliary electrodes adjacent to the driving units, and a driving voltage is suitable for being input to the auxiliary electrodes.

17. The display apparatus as recited in claim 10, wherein the third electrode layer further comprises a plurality of auxiliary electrodes, and locations of the auxiliary electrodes are exposed by the floating second electrodes.

18. The display apparatus as recited in claim 17, wherein a voltage of the third electrodes is substantially equal to a voltage of the auxiliary electrodes.

19. The display apparatus as recited in claim 10, wherein a ground voltage is input to the first electrode layer, and a driving voltage is input to the third electrodes.

20. The display apparatus as recited in claim 10, wherein the liquid crystal lens provides a stereo display function when the liquid crystal lens is driven to formed the lens unit.

* * * * *